US005197235A

United States Patent [19]

Schlick

[11] Patent Number: 5,197,235

[45] Date of Patent: Mar. 30, 1993

[54] ANCILLARY DEVICE FOR REMOVING ABRASIVE FROM LARGE SAND BLASTED WORKPIECES

[75] Inventor: Horst-Dieter Schlick, Metelen, Fed. Rep. of Germany

[73] Assignee: Schlick-roto-jet Maschinenbau GmbH, Metelen, Fed. Rep. of Germany

[21] Appl. No.: 706,918

[22] Filed: May 29, 1991

[30] Foreign Application Priority Data

Jun. 1, 1990 [DE] Fed. Rep. of Germany ....... 4017677

[51] Int. Cl.[5] ........ B08B 9/02

[52] U.S. Cl. ........ 51/419; 51/417; 15/94

[58] Field of Search ........ 51/410, 417, 419, 421, 51/411; 414/415, 222; 15/94

[56] References Cited

U.S. PATENT DOCUMENTS

| | | | |
|---|---|---|---|
| 2,343,357 | 3/1944 | Zimmerman | 51/411 |
| 4,381,577 | 5/1983 | Boye et al. | 15/94 |
| 4,662,125 | 5/1989 | Brenner et al. | 51/417 |
| 4,917,708 | 4/1990 | Yamaguchi et al. | 51/419 |
| 5,054,155 | 10/1991 | McKibben et al. | 15/94 |

FOREIGN PATENT DOCUMENTS

| | | | |
|---|---|---|---|
| 0089620 | 9/1983 | European Pat. Off. | 51/419 |
| 0116977 | 8/1984 | European Pat. Off. | |
| 936176 | 12/1955 | Fed. Rep. of Germany | |
| 2522620 | 12/1976 | Fed. Rep. of Germany | |
| 3306857 | 8/1984 | Fed. Rep. of Germany | |
| 137546 | 9/1979 | German Democratic Rep. | |
| 59-47139 | 3/1984 | Japan | |

*Primary Examiner*—Douglas D. Watts
*Assistant Examiner*—Hwei-Siu Payer
*Attorney, Agent, or Firm*—Sprung Horn Kramer & Woods

[57] ABSTRACT

An ancillary device with at least one rotating workpiece holder for removing abrasive from externally accessible cavities inside such large workpiece as engine blocks, transmission housings, etc. once they have been sand blasted in a centrifugal-jet system. The device has a shaft (4) that has the workpiece holder (3) extending out of its outer end and that rotates along with the workpiece holder about a single horizontal axis. The device also has a rotary drive mechanism (7) that has a horizontal axis of rotation. The inner end of the shaft is secured to the drive mechanism by way of a transmission, causing the shaft to rotate or pivot about its axis. The device can also have at least two shafts (4 & 5) with workpiece holders (3 & 6) mounted symmetrically on the rotary drive mechanism.

6 Claims, 1 Drawing Sheet

10 9 U P P 21 16 15 17 13 6 5 7 1 14 11 4 3 20 REMOVAL 8 WORKPIECE TRANSFER 2 WORKPIECE SUPPLY 18

ANCILLARY DEVICE FOR REMOVING ABRASIVE FROM LARGE SAND BLASTED WORKPIECES

BACKGROUND OF THE INVENTION

The invention concerns an ancillary device with at least one rotating workpiece holder for removing abrasive from externally accessible cavities inside such large workpieces as engine blocks, transmission housings, etc. once they have been sand blasted in a centrifugal-jet system.

It is known to rotate workpieces that have been sand blasted in a centrifugal-jet system by means of a rotating workpiece holder in order to allow the abrasive to trickle out and be removed from the externally accessible cavities. The workpieces can be secured for example by clamping or in cages (cf. German Patent No. 2 522 620) and accordingly rotated. It has been demonstrated that removing the abrasive from the accessible spaces inside complex workpieces once they have been sand blasted is more difficult than the blasting itself. Particularly problematic are curved water reservoirs in automotive cylinder heads and engine housings.

Abrasive-removing stations integrated into the sand blasting systems are not adequate for such large and complex workpieces because all the rotations involved in the blasting process may not be at satisfactory angles for abrasive removal.

SUMMARY OF THE INVENTION

A principal object of the present invention is to allow sand blasting systems to operate without special emptying positions and to simplify the systems while ensuring reliable removal of abrasive from all the externally accessible cavities in the sand blasted workpieces.

This object, as well as other objects and advantages which will become apparent from the discussion that follows, are achieved in accordance with the present invention in an ancillary device of the aforesaid type by providing a shaft that has the workpiece holder extending out of its outer end and that rotates about a single horizontal axis, and by providing a rotary drive mechanism to which the inner end of the shaft is secured by way of a transmission, that rotates or pivots the shaft around its axis.

Also known, from German Patent Publication No. A1 3 306 857, is a conveyor for conveying castings through casting-polishing systems. The device has a tongs-like casting holder that rotates around a horizontal yet slightly sloping axis and presents the castings to the polishing jet at as many angles as possible. The rotation in this known device also helps ensure that the loose casting sand will drop off so that unprocessed areas can be presented to the jet. This device is accordingly not an ancillary device but the actual blaster and polisher that is positioned upstream of the apparatus that the present application is based on. In this event all the cleaning and transfer stations constitute the ancillary device. Even when just two cleaning stations are positioned in a row, every spatially conceivable abrasive-removal position will be ensured.

Vibrators, contact jolters or induction jolters for example, can also be provided at specific points in the abrasive-removal device according to the invention to vibrate the workpiece holder and the workpiece. It is also possible to design the ancillary device not to assume all possible positions one after another but to assume only certain programmed positions associated with a specific workpiece and to ignore unnecessary positions.

The preferred embodiments of the present invention will now be described with reference to the accompanying drawings.

BRIEF DESCRIPTION OF THE DRAWING

The single FIGURE is a schematic representation of the preferred embodiment of the device according to the invention.

DESCRIPTION OF THE PREFERRED EMBODIMENT

Figure 1:
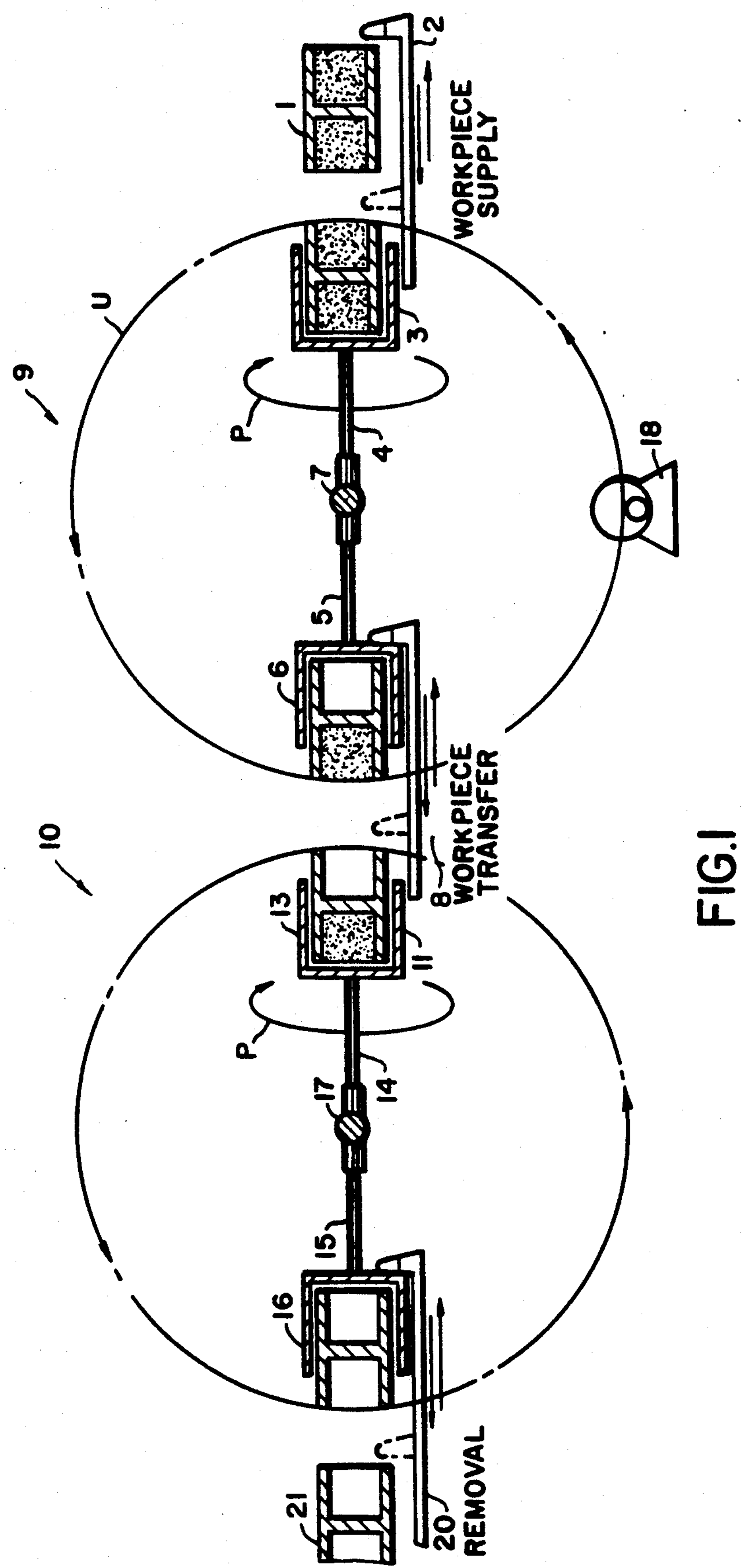

The ancillary device according to the invention has two cleaning stations 9 and 10 and a transfer station 8. Workpiece 1 is supplied from a centrifugal-jet abrasive ("sand") blasting system (not shown). The workpiece has externally accessible cavities in which a considerable amount of abrasive becomes trapped during the sand blasting process. A loading device 2 inserts the workpiece 1 into a workpiece holder 3, in which it is secured. The workpiece holder is in the form of a cage mounted axially on a shaft 4 that rotates around its own longitudinal axis along with the cage in the direction indicated by arrow P. Workpiece holder 3 is at the outer end of shaft 4. Other workpiece holders, jaws or clamps for example, can also be employed instead of a cage.

Initial cleaning station 9 also has another rotary drive mechanism 7 with a horizontal axis. Shaft 4 attaches to mechanism 7 by way of a transmission and the mechanism rotates or pivots it around its horizontal axis. This clockwise rotation is represented by the circle U. To improve efficiency and to compensate for imbalance, another shaft 5 is mounted on the rotary drive mechanism 7. Another workpiece holder 6 in the form of a cage is mounted on shaft 5. At the lowermost level of the first cleaning station is another, non-contact, vibrator 18 that vibrates workpiece holder 3 and workpiece 1 as they stop in its vicinity, loosening and shaking off any adhering particles of abrasive. An identical or similar vibration station can also be positioned at other points in the sequence of operations. It is also possible to connect such a vibrator directly to the cage or workpiece by means of a pusher.

A transfer station 8 is arranged between cleaning stations 9 and 10, which are essentially identical in structure. The workpiece can be released, the cage opened, and the workpiece removed. Depending upon what angles are necessary and what angles are to be avoided, workpiece 11 is transferred from workpiece holder 6 to cage 13. Cavities that may have previously been ignored or laid open will now arrive in an appropriate position for the abrasive to drop out. Second cleaning station 10 has for this purpose corresponding shafts 14 and 15, a rotary drive mechanism 17, and workpiece holders 13 and 16. Once it has traveled through cleaning station 10, the workpiece 21 can be removed at a removal station 20.

The aforesaid ancillary device can be essentially simpler than a sand blasting system, ensuring that the workpiece will be rotated into every conceivable position in space, leaving no abrasive behind.

There has thus been shown and described a novel ancillary device for removing abrasive from large sand blasted workpieces which fulfills all the objects and advantages sought therefor. Many changes, modifications, variations and other uses and applications of the subject invention will, however, become apparent to those skilled in the art after considering this specification and the accompanying drawing which discloses the preferred embodiment thereof. All such changes, modifications, variations and other uses and applications which do not depart from the spirit and scope of the invention are deemed to be covered by the invention, which is to be limited only by the claims which follow.

What is claimed is:

1. In apparatus for removing abrasive from external accessible cavities inside a large workpiece subsequent to sand blasting in a centrifugal-jet system, the improvement comprising first and second cleaning stations (9 and 10) for removing the abrasive, and a workpiece transfer station (8) interposed between the first and second cleaning stations to reorient and transfer workpieces (1, 11, 21) from one cleaning station to the other, each cleaning station including the following components:

(1) at least two shafts, each having a workpiece holder at one end and each adapted to rotate along with the workpiece holder about a single horizontal axis, and (2) a rotary drive mechanism coupled to the opposite end of each shaft, with said shafts mounted symmetrically on said drive mechanism, said drive mechanism having a transmission for rotating said shafts about their horizontal axes.

2. The apparatus defined in claim 1, comprising (1) a first subassembly that comprises the first cleaning station, (2) a second subassembly that comprises the second cleaning station, and (3) said transfer station being interposed between the first and second subassemblies to transfer the workpiece from one to the other with due regard to reorienting the workpiece as necessary.

3. The apparatus defined in claims 1, wherein the workpiece holders are cages.

4. The apparatus defined in claims 1, wherein the workpiece holders are clamps.

5. The apparatus defined in claim 1, further comprising a vibrator at at least one cleaning station for vibrating the workpiece holder.

6. The apparatus defined in claim 1, further comprising a vibrator at at least one cleaning station for vibrating the workpiece.

* * * * *